(12) United States Patent
Medl (10) Patent No.: US 6,728,632 B2
(45) Date of Patent: Apr. 27, 2004

(54) NAVIGATION DEVICES, SYSTEMS, AND METHODS FOR DETERMINING LOCATION, POSITION, AND/OR ORIENTATION INFORMATION BASED ON MOVEMENT DATA GENERATED BY A MOVEMENT DETECTOR (75) Inventor: Thomas E. Medl, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/944,039

(22) Filed: Aug. 30, 2001

(65) Prior Publication Data
US 2003/0045998 A1 Mar. 6, 2003

(51) Int. Cl.[7] ............................................... G01C 21/12
(52) U.S. Cl. ...................... 701/207; 701/220; 702/150
(58) Field of Search ................................ 701/200, 207, 701/220, 217, 300; 342/357.09, 357.1, 357.17; 702/150, 152, 153

(56) References Cited

U.S. PATENT DOCUMENTS

| 5,175,759 | A | * | 12/1992 | Metroka et al. | 455/569.1 |
| 5,615,132 | A | * | 3/1997 | Horton et al. | 703/7 |
| 5,949,369 | A | * | 9/1999 | Bradley et al. | 342/352 |
| 5,995,000 | A | * | 11/1999 | King | 340/438 |
| 6,091,956 | A | * | 7/2000 | Hollenberg | 455/456 |
| 6,246,376 | B1 | * | 6/2001 | Bork et al. | 343/760 |
| 6,327,533 | B1 | * | 12/2001 | Chou | 701/207 |
| 6,392,486 | B1 | * | 5/2002 | Lemay, Jr. | 330/253 |
| 6,493,104 | B1 | * | 12/2002 | Cromer et al. | 358/1.15 |

FOREIGN PATENT DOCUMENTS

GB           2281838 A    *  3/1995    ............. G06F/3/00

OTHER PUBLICATIONS

Burtch, Robert. Analytical Photgrammmatry/ SURE 4440 On–Line Syllabus, Aug. 1999. http://instruction.ferris.edu/burtchr/sure440/syllabus.html.

The Center for Photogrammetric Training, "Projective Equations." Aug. 1999, pp. 34–50. http://instruction.ferris.edu/burtchr/sure440/syllabus.html.

* cited by examiner

Primary Examiner—Michael J. Zanelli
(74) Attorney, Agent, or Firm—Myers Bigel Sibley & Sajovec, P.A.

(57) ABSTRACT

A navigation system includes a navigation device that communicates with a data processing system. The navigation device includes one or more movement detectors that are configured to generate data that are indicative of movement of the navigation device, and a transmitter that is communicatively coupled to the one or more movement detectors. The transmitter is configured to transmit a signal that contains the movement data using a wireless communication protocol. The data processing system includes a receiver that is responsive to the signal from the navigation device and a processor that is communicatively coupled to the receiver. The processor is programmed to process the data to compute a location, position, and/or orientation of the navigation device.

34 Claims, 10 Drawing Sheets

NAVIGATION DEVICES, SYSTEMS, AND METHODS FOR DETERMINING LOCATION, POSITION, AND/OR ORIENTATION INFORMATION BASED ON MOVEMENT DATA GENERATED BY A MOVEMENT DETECTOR

BACKGROUND OF THE INVENTION

The present invention relates generally to the field of communications, and, more particularly, to navigation devices and systems.

The global positioning system (GPS) provides specially coded satellite signals that can be processed in a GPS receiver to enable the receiver to compute position, velocity and time. GPS technology may be utilized in wireless devices to obtain user location information. For example, GPS technology may enable rescue workers to navigate quickly to people who need emergency help. Unfortunately, for certain nonemergency applications that may benefit from location information, GPS technology may not provide the location accuracy that may be needed by these applications.

SUMMARY OF THE INVENTION

Embodiments of the present invention provide navigation devices, navigation systems, and methods of operating same. In some embodiments, a navigation system comprises a navigation device that communicates with a data processing system. The navigation device comprises one or more movement detectors that are configured to generate data that are indicative of movement of the navigation device, and a transmitter that is communicatively coupled to the one or more movement detectors. The transmitter is configured to transmit a signal that contains the movement data using a wireless communication protocol. The data processing system comprises a receiver that is responsive to the signal from the navigation device and a processor that is communicatively coupled to the receiver. The processor is programmed to process the data to compute a location, position and/or orientation of the navigation device.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

The present invention may be embodied as devices, systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 1:
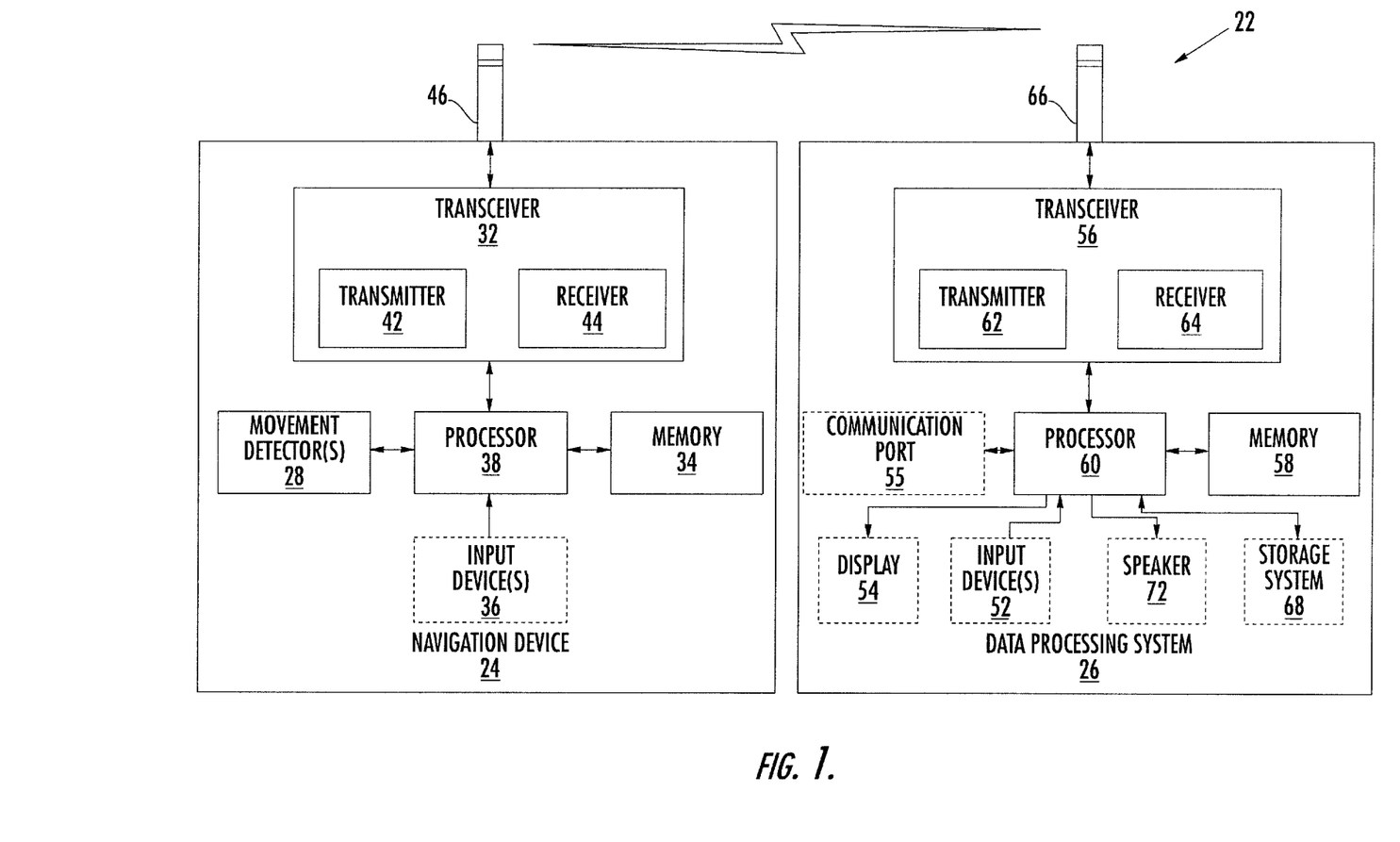
FIG. 1 is a schematic that illustrates navigation systems in accordance with embodiments of the present invention.

Referring now to FIG. 1, an exemplary navigation system 22, in accordance with embodiments of the present invention, comprises a navigation device 24 and a data processing system 26. In some embodiments of the present invention, the navigation system 22 may be used in a local wireless communication network having a defined navigation area. As shown in FIG. 1, the navigation device 24 comprises one or more movement detectors 28, a transceiver 32, a memory 34, and one or more input devices 36 that communicate with a processor 38. The movement detector(s) 28 may comprise, for example, one or more accelerometers that can be configured to measure movement of the navigation device 24 in three or six degrees-of-freedom (DOF). For example, for three DOF, accelerations may be measured in each of three perpendicular directions corresponding to the x, y, and z-axes of a Cartesian coordinate system. For six DOF, three additional accelerations may be measured corresponding to pitch, roll, and rotation. Thus, navigation devices configured with a three DOF movement detection capability may allow their locations to be computed. Navigation devices configured with a six DOF movement detection capability may allow their locations and their orientations to be computed. Six DOF navigation devices may be used, for example, to track the movement of a user's head. That is, the navigation device 24 may be attached to a user's head so that the pitch, roll, and rotation measurements are associated with movement of the user's head.

The movement detector(s) 28 may further comprise a compass for providing direction information and/or a gyroscope for measuring rotational movement of the navigation device 24, which may supplement the accelerometers and/or replace one or more of the accelerometers. The transceiver 32 comprises a transmitter circuit 42 and a receiver circuit 46, which respectively transmit outgoing signals to the data processing system 26 and receive incoming signals from the data processing system 26 via an antenna 46. The signals transmitted between the navigation device 24 and the data processing system 26 may comprise both data that are indicative of movement of the navigation device 24 and control signals, which are used to establish and maintain communication between the navigation device 24 and the data processing system 26. The navigation device 24 may also include one or more input devices 36, such as a keyboard or keypad, a blink detector, and/or a voice recognition system.

In some embodiments of the present invention, the navigation device 24 may be integrated with a "mobile terminal." As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/intranet access, Web browser, organizer, calendar and/or a GPS receiver; and a conventional laptop and/or palmtop receiver or other appliance that includes a radiotelephone transceiver. Mobile terminals may also be referred to as "pervasive computing" devices.

Extreme rotation and tilting of the navigation device 24 may cause accelerometer measurement errors. Therefore, in other embodiments of the present invention, the navigation device 24 may be implemented as a stand-alone device that is configured to be worn about a user's head or to attach to a user's clothes. In still other embodiments of the present invention, the navigation device 24 may be configured to be surgically implanted in a user's body.

Still referring to FIG. 1, a data processing system 26, in accordance with embodiments of the present invention, may comprise input device(s) 52, such as a keyboard or keypad, a display 54, a communication port 55 for communicating with a network and/or with other devices or systems through, for example, a serial or parallel port interface, a transceiver 56, and a memory 58 that communicate with a processor 60. The transceiver 56 comprises a transmitter circuit 62 and a receiver circuit 64, which respectively transmit outgoing signals to the navigation device 24 and receive incoming signals from the navigation device 24 via an antenna 64. The data processing system 26 may further include a storage system 68 and a speaker 72 that communicate with the processor 60. The storage system 68 may comprise removable and/or fixed media, such as floppy disks, ZIP drives, hard disks, or the like, as well as virtual storage, such as a RAMDISK. These data processing system 26 components may be conventional components, such as those used in many conventional computing devices and/or systems, which may be configured to operate as described herein.

Although FIG. 1 illustrates an exemplary navigation system architecture, it will be understood that the present invention is not limited to such a configuration but is intended to encompass any configuration capable of carrying out the operations described herein.

Figure 2:
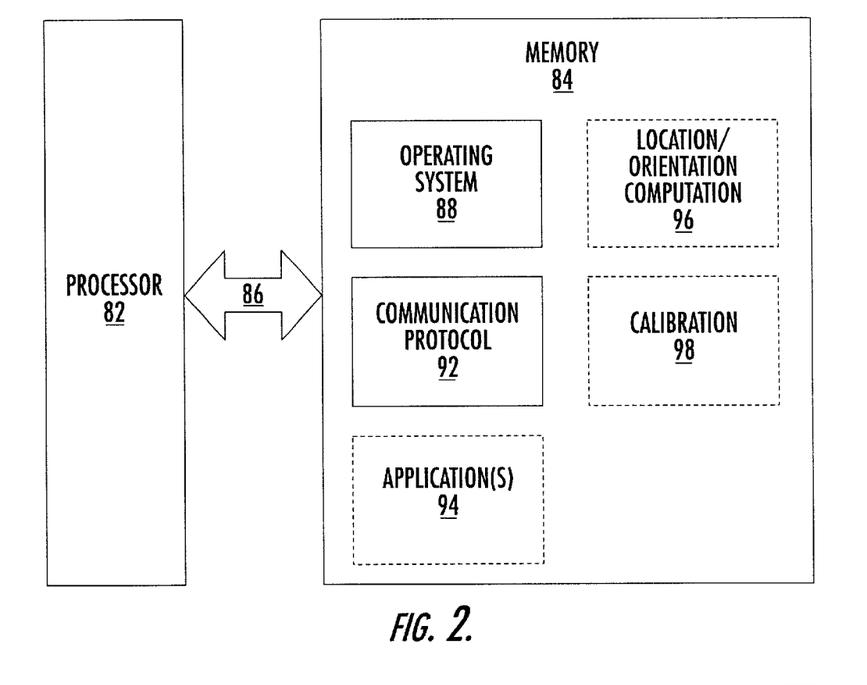
FIG. 2 is block diagram that illustrates exemplary software architectures for use in navigation devices in accordance with embodiments of the present invention.

FIG. 2 illustrates a processor 82 and a memory 84 that may be used in embodiments of the navigation device 24 in accordance with the present invention. The processor 82 communicates with the memory 84 via an address/data bus 86. The processor 82 may be, for example, a commercially available or custom microprocessor. The memory 84 is representative of the overall hierarchy of memory devices containing the software and data used to operate a navigation device, such as the navigation device 24 of FIG. 1. The memory 84 may include, but is not limited to, the following types of devices: cache, ROM, PROM, EPROM, EEPROM, flash, SRAM, and DRAM.

As shown in FIG. 2, the memory 84 may contain up to five or more major categories of software and/or data: the operating system 88, the communication protocol program module 92, the application(s) program module 94, the location/orientation computation program module 96, and the calibration program module 98. The operating system 88 controls the operation of the computer system. In particular, the operating system 88 may manage the computer system's resources and may coordinate execution of programs by the processor 82.

The communication protocol program 92 may be configured to implement a wireless communication protocol that is based on a wireless communication technology, such as, but not limited to, Bluetooth, time division multiple access (TDMA), code division multiple access (CDMA), and global system for mobile communication (GSM). Radio frequency (RF) wireless technologies are generally preferred, as they may allow a navigation device to communicate with a data processing system without any line-of-sight requirement. TDMA, CDMA, and GSM may provide relatively long-range RF communication capability. These technologies, however, may be more complicated and more expensive to implement than Bluetooth systems.

Bluetooth is a universal radio interface in the 2.45 GHz frequency band that enables portable electronic devices to connect and communicate wirelessly via shortrange, ad hoc networks. Bluetooth technology is generally targeted towards the elimination of wires, cables, and connectors between such devices and systems as cordless or mobile phones, modems, headsets, PDAs, computers, printers, projectors, and local area networks. More information on the Bluetooth interface can be found in an article authored by Jaap Haartsen entitled "Bluetooth—The universal radio interface for ad hoc, wireless connectivity," Ericsson Review, No. 3, 1998, which is hereby incorporated herein by reference. If a relatively short-range communication capability is acceptable for a given application, then using Bluetooth technology to communicate may reduce the complexity and cost of a navigation device.

The application(s) program module 94 may comprise one or more client software applications that utilize the functionality of a navigation device in accordance with embodiments of the present invention. Exemplary applications of navigation devices and navigation systems, such as those discussed hereinabove with respect to FIG. 1, will be described hereinafter.

The location/orientation computation program 96 may be configured to process the data that are indicative of movement of a navigation device to determine the location, position, and/or orientation of the navigation device. Moreover, the location/orientation computation program 96 may compute angles between a navigation device and other known environmental landmarks. For example, a user's look direction may be computed using conventional geometric equations that are commonly used in the aerospace, robotics, computer graphics, and computer vision industries. The location orientation computation program 96 may, thus, determine if a navigation device is directed or oriented towards the known location(s) of one or more environmental landmark(s). A detailed discussion of mathematical principles involved determining a user's look direction and determining if this look direction is directed towards a landmark is provided at http://instruction.ferris.edu/burtchr/sure440/pdf/projective_equations.pdf. For a navigation device that uses one or more accelerometers to implement the movement detector, the location/orientation computation program 96 may mathematically integrate each acceleration measurement once to obtain a velocity measurement, and may mathematically integrate each acceleration measurement twice to obtain a location, position, and/or orientation.

The calibration program 98 may be configured to determine an initial location, position, and/or orientation for a navigation device such that a navigation device's current position may be computed by the location/orientation computation program 96 by processing the acceleration measurement(s) to determine a change in location and/or orientation, and then applying the computed change(s) to the initial location and/or orientation. The initial location and/or orientation may be determined by a user placing the navigation device at a selected location and/or in a selected orientation and then inputting a reset signal. The initial location and/or orientation may typically correspond with a landmark location that is known by one or more application programs 94.

In some embodiments of the present invention, the application(s) program 94, the location/orientation computation program 96, and/or the calibration program 98 may not be included in the memory 84. As will be discussed hereinafter, the functionality of the location/orientation computation program 96 and/or the calibration program 98 may be implemented as part of a data processing system, such as the data processing system 26 of FIG. 1.

Figure 3:
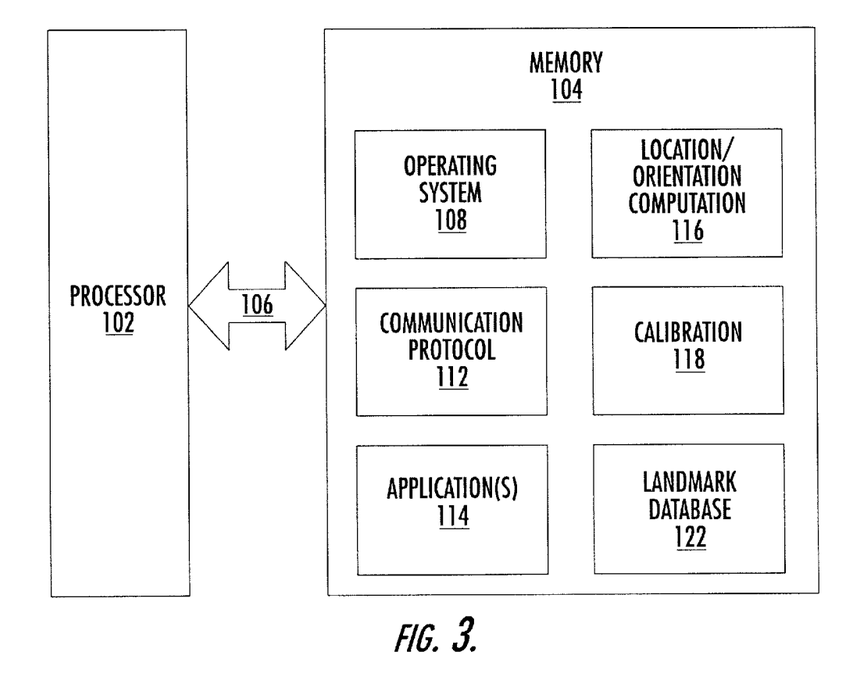
FIG. 3 is a block diagram that illustrates exemplary software architectures for use in navigation devices in accordance with embodiments of the present invention.

FIG. 3 illustrates a processor 102 and a memory 104 that may be used in embodiments of the data processing system 26 in accordance with the present invention. The processor 102 communicates with the memory 104 via an address/data bus 106. The processor 102 may be, for example, a commercially available or custom microprocessor. The memory 104 is representative of the overall hierarchy of memory devices containing the software and data used to operate a data processing system, such as the data processing system 26 of FIG. 1. The memory 104 may include, but is not limited to, the following types of devices: cache, ROM, PROM, EPROM, EEPROM, flash, SRAM, and DRAM.

As shown in FIG. 3, the memory 104 may contain up to six or more major categories of software and/or data: the operating system 108, the communication protocol program module 112, the application(s) program module 114, the location/orientation computation program module 116, the calibration program module 118, and the landmark database 122. The operating system 108 controls the operation of the computer system. In particular, the operating system 108 may manage the computer system's resources and may coordinate execution of programs by the processor 102.

The communication protocol program 112 may be configured to implement a wireless communication protocol that is based on a wireless communication technology, such as, but not limited to, Bluetooth, TDMA, CDMA, and GSM. RF wireless technologies are generally preferred as they may allow a data processing system to communicate with one or more navigation devices without any line-of-sight requirement. As discussed above, TDMA, CDMA, and GSM may provide relatively long-range RF communication capability. If, however, a relatively short-range communication capability is acceptable for a given application, then using Bluetooth technology may reduce the complexity and cost of a navigation system that comprises a data processing system and one or more navigation devices.

The application(s) program module 114 may comprise one or more client software applications that utilize the functionality of a navigation system that comprises a data processing system and one or more navigation devices, in accordance with embodiments of the present invention. Exemplary applications of navigation devices and navigation systems, such as those discussed hereinabove with respect to FIG. 1, will be described hereinafter.

The location/orientation computation program 116 may be configured to receive data that are indicative of movement of a navigation device and may process these data as discussed hereinabove with respect to the location/orientation computation program 96. Similar to the calibration program 98, the calibration program 118 may be configured to determine an initial location and/or orientation for a navigation device, such that a navigation device's current location, position, and/or orientation may be computed by the location/orientation computation program 116 by applying the processed movement data to the initial location and/or orientation. In more detail, the calibration program 118 may cooperate with the landmark database 122 to determine an initial location and/or orientation for a navigation device. The landmark database 122 may comprise a data structure in which a plurality of environmental landmarks are defined with each landmark having a location associated therewith.

Figure 4:
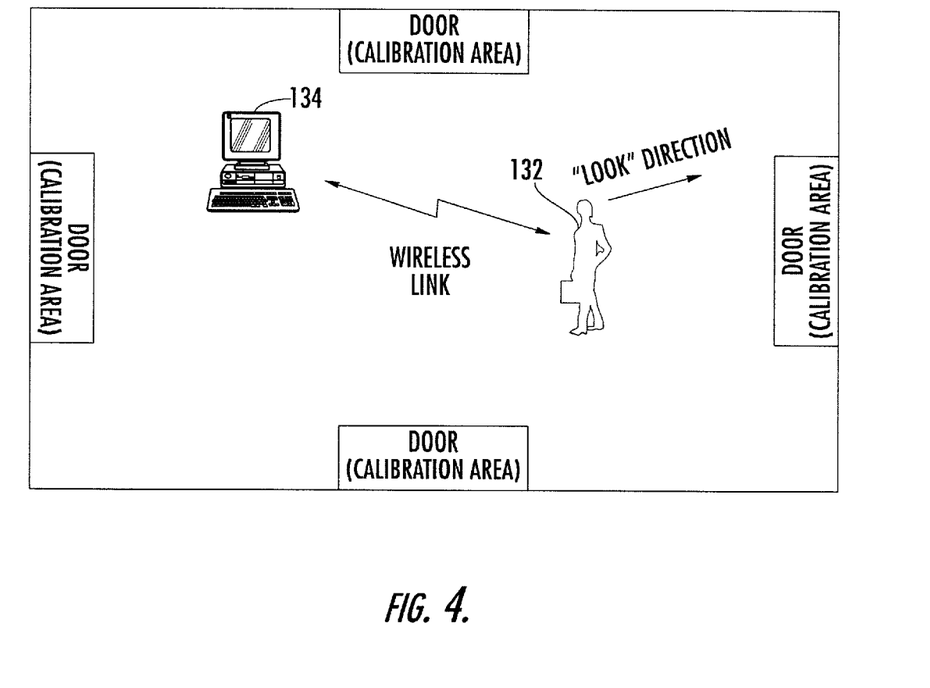
FIGS. 4–6 are diagrams that illustrate systems and operations for calibrating a navigation device in accordance with embodiments of the present invention.

In accordance with embodiments of the present invention, the calibration program 118 may determine an initial location and/or orientation of a navigation device in various ways. Referring now to FIG. 4, a user 132 may be equipped with a navigation device, such as the navigation device 24 of FIG. 1, attached to his/her head. As shown in FIG. 4, the navigation device worn by the user 132 is in wireless communication with a data processing system 134, such as the data processing system 26 of FIG. 1. In a first embodiment, the data processing system 134 receives a signal from a sensor located in the floor or ground when the user 132 steps on the sensor. The sensor and location thereof are defined in the landmark database 122 allowing the calibration program 118 to set the initial location of the navigation device to the sensor location.

In a second embodiment, one or more doors, which are marked as calibration areas in FIG. 4, may be equipped with an infrared beam. When the user 132 breaks the beam for a specific door, the data processing system 134 receives a signal associated with that door. The door and location thereof are defined in the landmark database 122 allowing the calibration program 118 to set the initial location of the navigation device to the door location.

To initialize the orientation of a six DOF navigation device, the user 132 may momentarily stand in a known location and stare at a known object. In the example shown in FIG. 4, the user 132 stares at the right door and causes a reset signal to be sent to the data processing system 134. The calibration program 118 may then set the initial orientation of the navigation device as being directed towards the right door.

Figure 5:
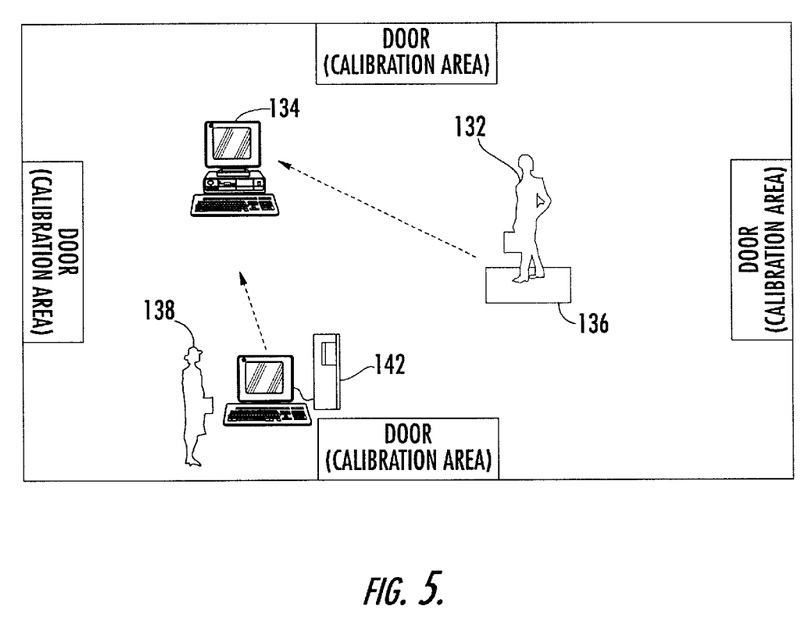

The frequency with which a navigation device and/or a navigation system needs to be recalibrated will typically depend on the severity of the drift in the movement detector (s) (e.g., accelerometers). In other embodiments of the present invention, calibration (i.e., determining an initial location and/or orientation) of a navigation device may be performed when a user carrying the navigation device interacts with an environmental landmark. For example, as shown in FIG. 5, a signal is sent to the data processing system 134 when the user 132 carrying a first navigation device steps on a predefined region 136. Similarly, a signal is sent to the data processing system 134 when a user 138 carrying a second navigation device uses the computer 142. The transmissions from communication circuits associated with the predefined region 136 and the computer 142 to the data processing system 134 may be made using wireless or wireline connections. Both the predefined region 136 and the computer 142 may be defined in the landmark database 122 allowing the calibration program 118 to set the initial locations of the first and the second navigation devices to the locations of the predefined region 136 and the computer 142, respectively.

Figure 6:
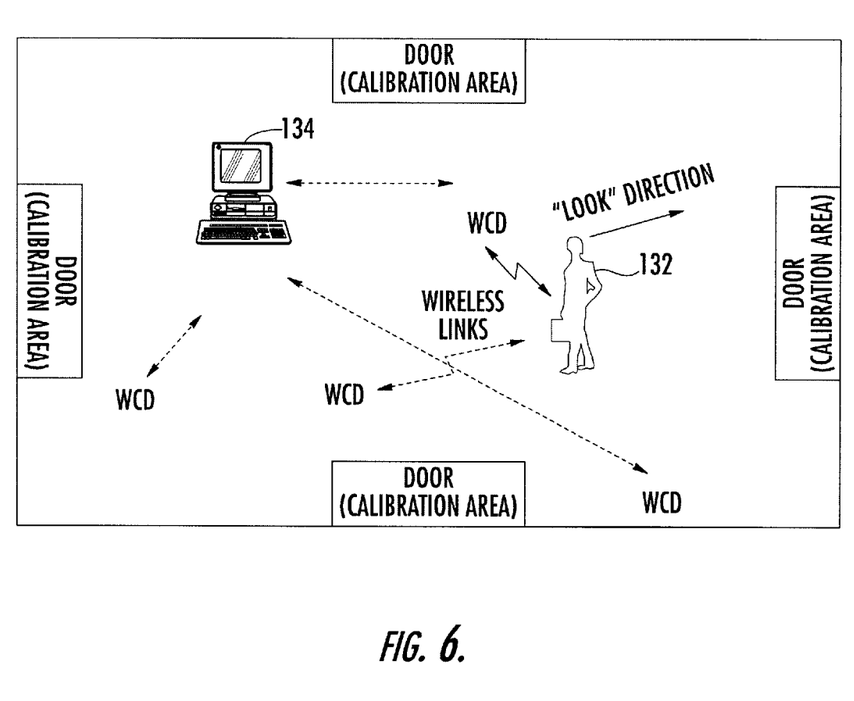

FIG. 6 illustrates still further embodiments for calibrating a navigation device. A plurality of interrogation devices, which are implemented as wireless communication devices (WCDs), are positioned throughout an area that is to be navigated. These WCDs may be configured to query for other wireless devices in their vicinity. If a navigation device carried by the user 132 responds to a query of a WCD, then that WCD transmits a "contact" signal to the data processing system 34 notifying the data processing system 134 that the navigation device carried by the user 132 is near that WCD. WCDs may be statically positioned throughout the navigation environment or the WCDs may be mobile and move throughout the navigation environment. The WCDs and current locations thereof are defined and maintained in the landmark database 122 allowing the calibration program 118 to set a present location of a navigation device to the location of the WCD that transmitted the contact signal.

It will be understood that the navigation device calibration embodiments described in the foregoing are not mutually exclusive. Aspects of various embodiments described herein may be combined to create still other embodiments for determining an initial location and/or orientation of a navigation device.

In addition to facilitating calibration of a navigation device, the landmark database 122 may also be used by application program(s) 114. The application program(s) 114 may use location and/or orientation information of a navigation device, which is provided by the location/orientation computation program 116, and the landmark database 122 to determine whether or not to perform certain operations. For example, a determination may be made whether a navigation device is located within a predetermined distance of one or more of the landmarks defined in the landmark database 22. Depending on the result of this determination, certain operations may or may not be performed. A determination may also be made whether a navigation device is oriented such that it is directed towards a landmark defined in the landmark database 22. Depending on the result of this determination, certain operations may or may not be performed.

Computer program code for carrying out operations of the present invention may be written in an object-oriented programming language, such as, but not limited to, Java, Smalltalk, or C++. Computer program code for carrying out operations of the present invention may also, however, be written in conventional procedural programming languages, such as, but not limited to, the C programming language or compiled Basic (CBASIC). In addition, computer program code for carrying out operations of the present invention may also be written in other programming languages, such as, but not limited to, interpreted languages. Some modules or routines may be written in assembly language or even micro-code to enhance performance and/or memory usage.

The present invention is described hereinafter with reference to flowchart and/or block diagram illustrations of devices, methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

A navigation system, such as the navigation system 22 of FIG. 1, may be used in a variety of applications, which will be described hereafter. These exemplary applications illustrate various principles and concepts of the present invention. It will be understood that the present invention is not limited to these specific examples.

An application program executing on a navigation device, such as the navigation device 24 of FIG. 1, may attempt to use a service that is accessible using, for example, Bluetooth wireless communication technology. The Bluetooth service discovery protocol allows an application to send an inquiry message to look for Bluetooth servers that may be available to fulfill a service request. A navigation system, such as the navigation system 22 of FIG. 1, may be used to facilitate a selection of a Bluetooth server if multiple Bluetooth servers are available to fulfill a service request.

Figure 7:
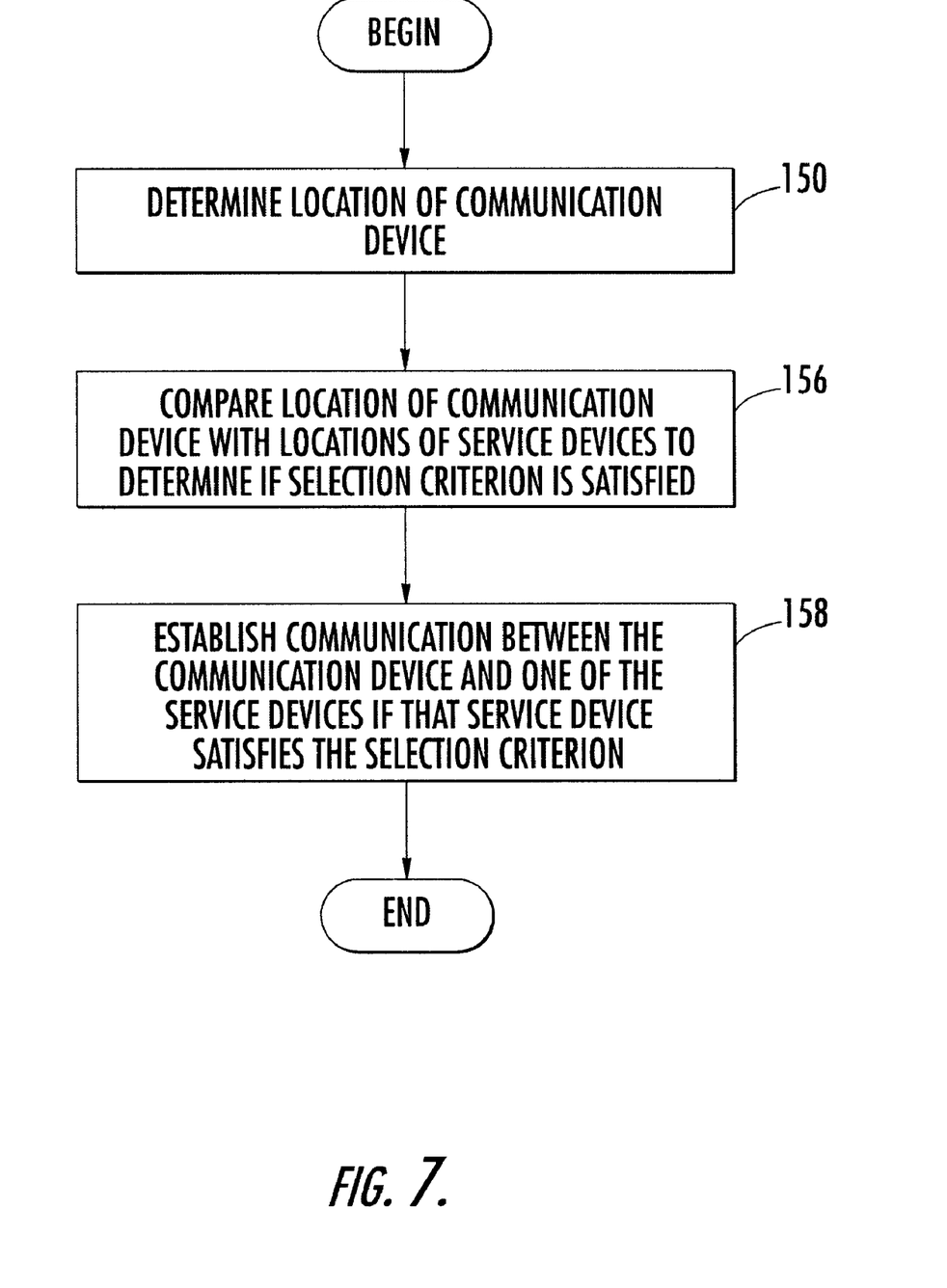
FIG. 7 is a flowchart that illustrates operations for selecting a device to communicate with in accordance with embodiments of the present invention.
Figure 8:
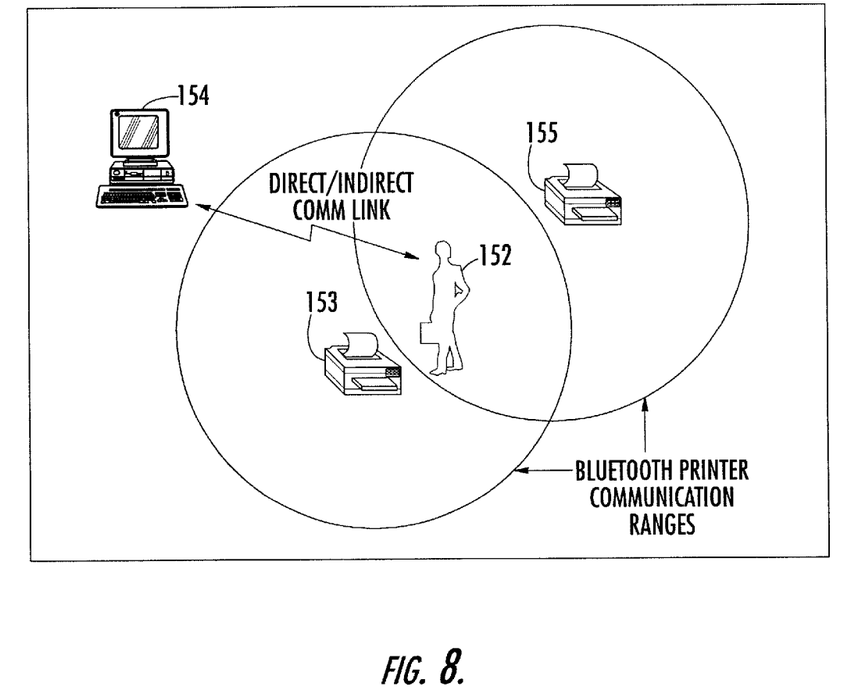
FIG. 8 is a diagram that illustrates systems and operations for selecting a device to communicate with in accordance with embodiments of the present invention.

Referring now to FIGS. 7 and 8, operations begin at block 150 where a data processing system 154 determines a location of a navigation device worn by a user 152. At block 156 the data processing system 154 compares the location of the navigation device worn by the user 152 with the locations of Bluetooth printers 153 and 155, which are defined, for example, in a landmark database. The respective distances between the navigation device worn by the user 152 and the Bluetooth printers 153 and 155 may be sent by an application program executing on the data processing system 154 to the application program executing on the navigation device worn by the user 152. At block 158, the application program executing on the navigation device worn by the user 152 may then establish communication with one of the two Bluetooth printers 153 and 155 by applying a selection criterion to the distances from the Bluetooth printers 153 and 155 received from the data processing system 154. For example, the application program may select the closest printer or, alternatively, the application program may select the printer that is closest to an assistant's work location.

Figure 9:
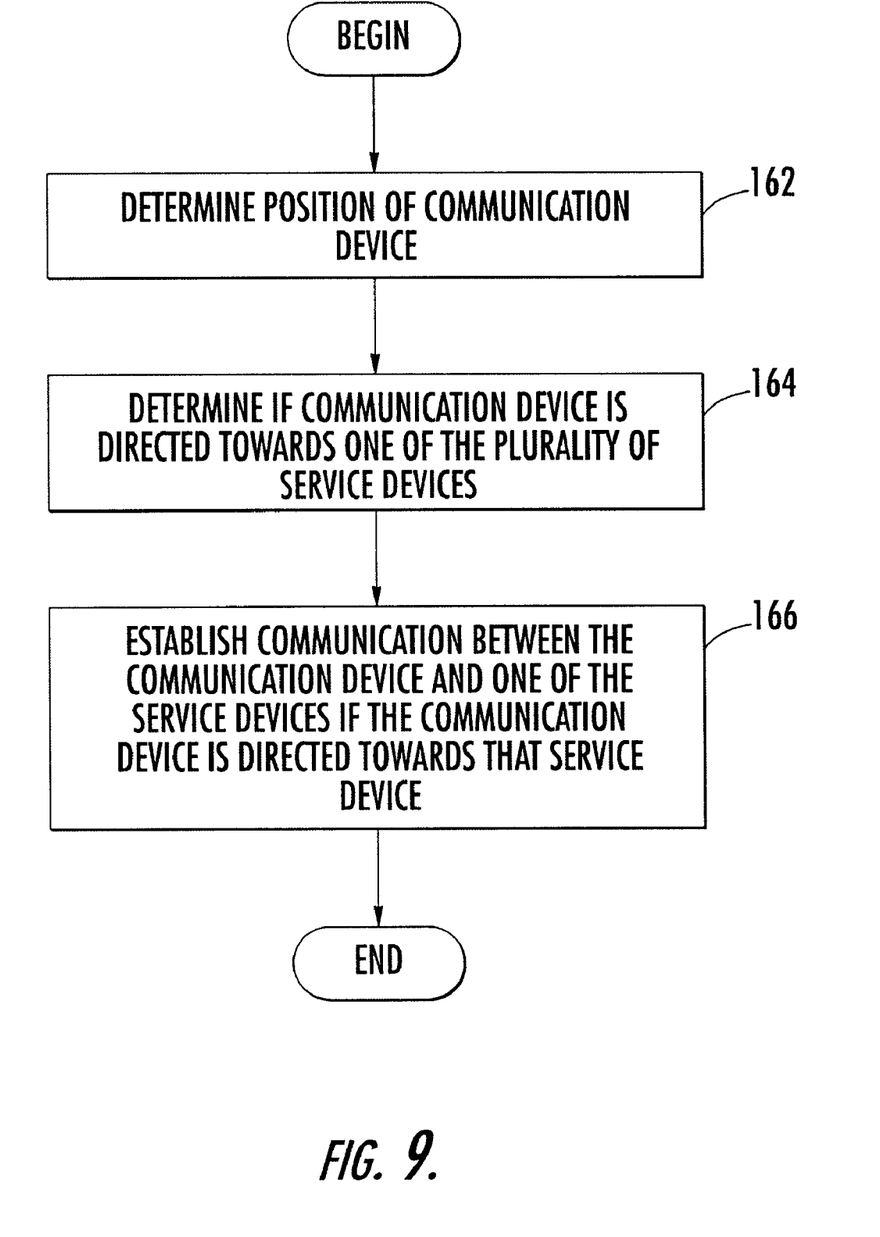
FIG. 9 is a flowchart that illustrates operations for selecting a device to communicate with in accordance with further embodiments of the present invention.
Figure 10:
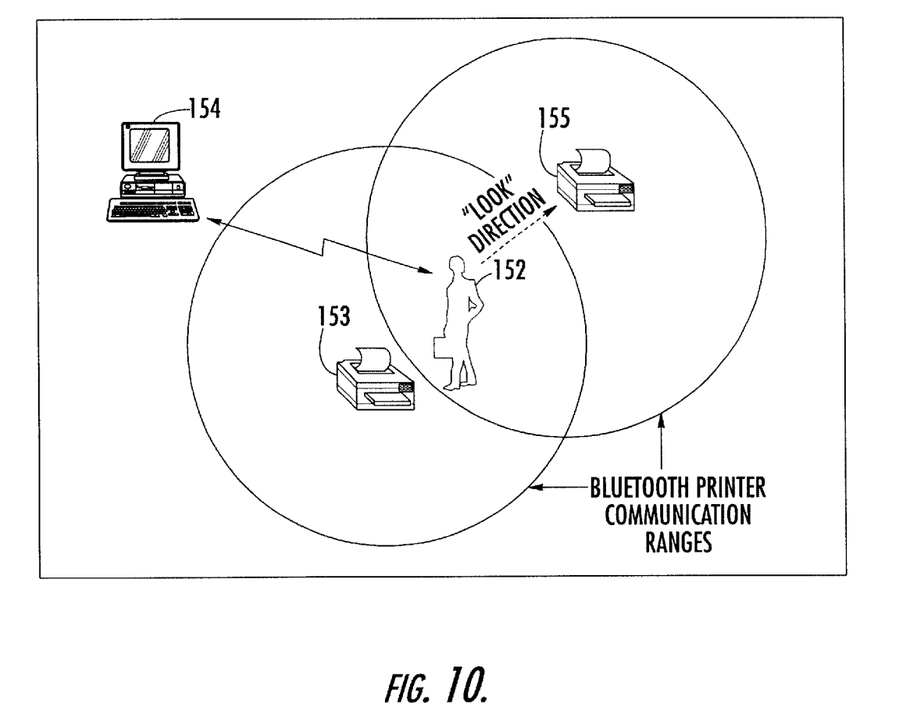
FIG. 10 is a diagram that illustrates systems and operations for selecting a device to communicate with in accordance with further embodiments of the present invention.

In other embodiments illustrated in FIGS. 9 and 10, operations begin at block 162 where the data processing system 154 determines a location of the navigation device worn by a user 152. In this example, the navigation device worn by the user 152 is configured with six DOF motion detectors. At block 164 the data processing system 154 determines if the navigation device worn by the user 152 is directed at one of the Bluetooth printers 153 or 155 (i.e., the user is looking at one of the Bluetooth printers 153 or 155). As shown in FIG. 10, the user 152 is looking at Bluetooth printer 155. The identification of the Bluetooth printer 155 may be passed from the application program executing on the data processing system 154 to the application executing on the navigation device worn by the user 152. At block 166, the application program executing on the navigation device worn by the user 152 may then establish communication with Bluetooth printer 155 as it was identified by the data processing system 154 as the Bluetooth printer that is being looked at by the user 152.

The flowcharts of FIGS. 7 and 9 illustrate the architecture, functionality, and operations of embodiments of the navigation system 22 software. In this regard, each block represents a module, segment, or portion of code, which comprises one or more executable instructions for implementing the specified logical function(s). It should also be noted that in some alternative implementations, the function(s) noted in the blocks may occur out of the order noted in FIGS. 7 and 9. For example, two blocks shown in succession may, in fact, be executed substantially concurrently or the blocks may sometimes be executed in the reverse order, depending on the functionality involved.

Navigation systems, according to embodiments of the present invention, may also be used in the following scenarios and applications:

1) A customer walks into a shopping mall and is offered a coupon to use at any of the stores in exchange for walking around with a navigation device attached to their person while they shop. The navigation device provides location information about the customer to a data processing system while the person remains in the mall. The navigation device may be configured with a six DOF movement detector to allow the person's look direction to be recorded. Data collected from several mall customers may be compiled and processed to determine which stores and/or store sections are attracting customers, how long a customer remains in a store, what items were looked at in a store, etc.

2) A data processing system may maintain location information for numerous navigation devices. When a user of a navigation device is looking for a user of another navigation device, the data processing system may provide this information.

3) A parent may attach a navigation device to a child's clothing and arrange for a notification signal to be triggered if the child leaves some predefined navigation area.

4) Companies may track where people are located while on company property.

5) Hospitals may track where various medical staff, such as, but not limited to, doctors, nurses, and emergency personnel are located. In addition, the location of patients in a hospital may be tracked, which may allow the hospital staff to verify whether a patient is in the proper place (e.g., intensive care, preparation for surgery, etc.). To enhance hospital security, newborn babies may be outfitted with navigation devices to ensure that they are not taken out of a maternity ward without proper authorization.

6) Robots with navigation devices may have their movements directed throughout a navigation area via a data processing system.

Figure 11:
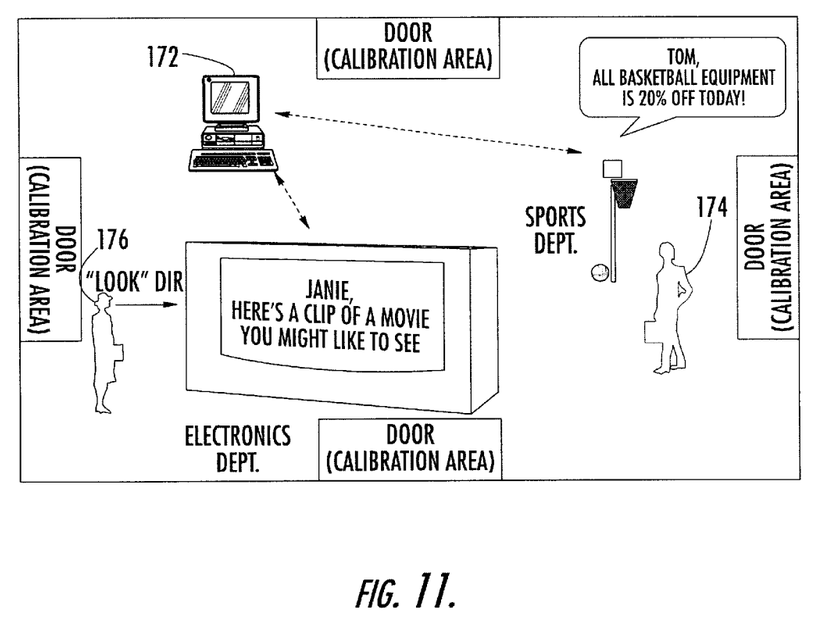
FIG. 11 is a diagram that illustrates exemplary applications of navigation systems in accordance with embodiments of the present invention.

7) A data processing system may track the movements of customers equipped with navigation devices throughout a store or shopping mall. As shown in FIG. 11, a data processing system 172 may cause an audible announcement to be played when a customer 174 nears a sporting goods display. Similarly, the data processing system 172 may dynamically change an electronic storefront sign when a customer 176 looks at the sign to highlight an item that the customer may be likely to purchase.

8) Special lights or signs may be turned on by a data processing system when a hearing-impaired person wearing a navigation device passes a landmark that normally emits sound. These lights and/or signs may be unpleasant to other persons, so the data processing system ensures that they are only used when a hearing impaired person is near. Similarly, a data processing system may cause special sounds to be emitted when a vision-impaired person passes a landmark that normally displays a sign, for example.

9) A person with a six DOF navigation device owns multiple stereos. The person turns towards one stereo and stares at the stereo to open a Bluetooth connection. Next, the person stares at the volume control knob and, if the navigation device is equipped with a blink detector, the person may blink to raise the volume. Alternatively, the user may be equipped with a voice recognition system and may speak to raise the volume. Alternatively, after the Bluetooth connection is opened, a menu could be displayed on a wireless communication device to control the stereo. A person with a three DOF navigation device may control a stereo in like manner if, for example, it could be assumed that the person always wants to control the stereo closest to the person's current location.

Many variations and modifications can be made to the preferred embodiments without substantially departing from the principles of the present invention. All such variations and modifications are intended to be included herein within the scope of the present invention, as set forth in the following claims.

I claim:

1. A navigation device for use in a local wireless communication network, comprising:
   at least one movement detector that comprises at least one accelerometer and is configured to generate data that are indicative of movement of the navigation device;
   a transmitter;
   a processor that is communicatively coupled to the at least one movement detector and to the transmitter, the processor being programmed to process the data and to transmit the processed data using a wireless communication protocol associated with the local wireless communication network and the transmitter; and
   a gyroscope that is configured to generate data that are indicative of rotational movement of the navigation device, the processor being communicatively coupled to the gyroscope, and being programmed to process the data that are indicative of rotational movement and to transmit the processed data that are indicative of rotational movement using the wireless communication protocol and the transmitter.

2. The navigation device of claim 1, further comprising:
   a compass that is communicatively coupled to the processor, the compass being configured to generate data that are indicative of movement direction of the navigation device, the processor being programmed to process the movement direction data and to transmit the processed movement direction data using a wireless communication protocol and the transmitter.

3. The navigation device of claim 1, wherein the at least one accelerometer comprises:
   a plurality of accelerometers that are configured to generate data that are indicative of movement of the navigation device in three degrees of freedom.

4. The navigation device of claim 3, wherein the plurality of accelerometers are configured to generate data that are indicative of movement of the navigation device in six degrees of freedom.

5. The navigation device of claim 1, wherein the processor is further programmed to mathematically integrate the data twice so as to compute at least one of a location and an orientation of the navigation device.

6. The navigation device of claim 1, wherein the processor is further programmed to determine at least one of an initial location and an initial orientation of the navigation device.

7. The navigation device of claim 6, wherein the initial location of the navigation device is associated with a landmark.

8. The navigation device of claim 1, wherein the, at least one movement detector comprises:
   a plurality of movement detectors that are configured to generate data that are indicative of movement of the navigation device in six degrees of freedom;
   wherein the processor is further programmed to compute at least one of a change in location and a change in orientation of the navigation device;
   wherein the navigation device is removably attached to the head of a person;
   wherein the processor is further programmed to determine an initial location of the person and an initial orientation of the head of the person; and
   wherein the processor is further programmed to determine at least one of a new location of the person and a new orientation of the head of the person based on the computed change in at least one of location and orientation of the navigation device.

9. The navigation device of claim 1, wherein the wireless communication protocol comprises a protocol that is based on a wireless communication technology selected from the group consisting of Bluetooth, time division multiple access (TDMA), code division multiple access (CDMA), and global system for mobile communication (GSM).

10. A data processing system for use in a local wireless communication network, comprising:
    a receiver that is responsive to a signal that is transmitted from a navigation device using a wireless communication protocol that is associated with the local wireless communication network, the signal containing data that are indicative of movement of the navigation device; and
    a processor that is communicatively coupled to the receiver, the processor being programmed to process the data so as to compute at least one of a location and an orientation of the navigation device;
    wherein the data are accelerometer data, and wherein the processor is further programmed to mathematically integrate the accelerometer data twice so as to compute at least one of the location and the orientation of the navigation device.

11. The data processing system of claim 10, further comprising:
    a computer-readable storage medium that is communicatively coupled to the processor, the computer-readable storage medium containing a data structure comprising a plurality of landmark definitions, each landmark definition having a location associated therewith.

12. The data processing system of claim 11, wherein the processor is further programmed to determine at least one of an initial location and an initial orientation of the navigation device.

13. The data processing system of claim 12, wherein the initial location of the navigation device is associated with one of the landmark definitions.

14. The data processing system of claim 12, wherein the processor is further programmed to determine a new location of the navigation device based on a computed change in at least one of the location and the orientation of the navigation device; and
    wherein the processor is further programmed to determine if the new location of the navigation device is within a predetermined distance of the locations of any of the plurality of landmark definitions.

15. The data processing system of claim 12, wherein the processor is further programmed to determine a new orientation of the navigation device based on a computed change in at least one of the location and the orientation of the navigation device; and
    wherein the processor is further programmed to determine if the new orientation of the navigation device is directed towards the locations of any of the plurality of landmark definitions.

16. A navigation system for use in a local wireless communication network, comprising:

a navigation device that comprises:
- at least one movement detector that is configured to generate data that are indicative of movement of the navigation device; and
- a transmitter that is communicatively coupled to the at least one movement detector and is configured to transmit a signal that contains the data using a wireless communication protocol that is associated with the local wireless communication network;

a data processing system that comprises:
- a receiver that is responsive to the signal from the navigation device; and
- a processor that is communicatively coupled to the receiver, the processor being programmed to process the data so as to generate at least one of a location and an orientation of the navigation device, and to determine at least one of an initial location and an initial orientation of the navigation device; and
- a plurality of wireless communication devices, a respective one of the plurality of wireless communication devices being configured to transmit a query signal;

wherein the navigation device further comprises a receiver that is communicatively coupled to the transmitter and is responsive to the query signal, the transmitter being further configured to transmit an identification signal to the respective one of the plurality of wireless communication devices in response to the query signal, the respective one of the plurality of wireless communication devices being further configured to transmit a contact signal to the data processing system that identifies the navigation device in response to receipt of the identification signal by the navigation device receiver.

17. The navigation system of claim 16, wherein the data processing system receiver is responsive to the contact signal, and the processor is further programmed to determine the initial location of the navigation device based on a known location of the respective one of the plurality of wireless communication devices in response to receipt of the contact signal by the data processing system receiver.

18. The navigation system of claim 16, further comprising:
- a landmark that is communicatively coupled to the data processing system; and
- wherein the navigation device is associated with a user and the processor is further programmed to determine the initial location of the navigation device based on a user interaction with the landmark.

19. The navigation system of claim 16, wherein the data processing system further comprises:
- a computer-readable storage medium that is communicatively coupled to the processor, the computer-readable storage medium containing a data structure comprising a plurality of landmark definitions, each landmark definition having a location associated therewith.

20. The navigation system of claim 19, wherein the processor is further programmed to determine a new location of the navigation device based on a computed change in at least one of the location and the orientation of the navigation device; and
- wherein the processor is further programmed to determine if the new location of the navigation device is within a predetermined distance of the locations of any of the plurality of landmark definitions.

21. The navigation system of claim 19, wherein the processor is further programmed to determine a new orientation of the navigation device based on a computed change in at least one of location and orientation of the navigation device; and
- wherein the processor is further programmed to determine if the new orientation of the navigation device is directed towards the locations of any of the plurality of landmark definitions.

22. The navigation system of claim 16, wherein the at least one movement detector comprises:
- a plurality of movement detectors that are configured to generate data that are indicative of movement of the navigation device in six degrees of freedom;
- wherein the navigation device is removably attached to the head of a person;
- wherein the processor is further programmed to determine an initial location of the person and an initial orientation of the head of the person; and
- wherein the processor is further programmed to determine at least one of a new location of the person and a new orientation of the head of the person based on a computed change in at least one of the location and the orientation of the navigation device.

23. The navigation system of claim 16, wherein the wireless communication protocol comprises a protocol that is based on a wireless communication technology selected from the group consisting of Bluetooth, time division multiple access (TDMA), code division multiple access (CDMA), and global system for mobile communication (GSM).

24. A method of operating a communication system, comprising:
- providing a plurality of service devices;
- providing an information repository that contains respective locations of the plurality of service devices;
- determining a location of a communication device;
- comparing the location of the communication device with the locations of the plurality of service devices to determine if one of the plurality of service devices satisfies a selection criterion; and
- establishing communication between the communication device and the one of the plurality of service devices if the one of the plurality of service devices satisfies the selection criterion.

25. The method of claim 24, further comprising:
- sending a service request message to the plurality of service devices; and
- determining which of the plurality of service devices respond to the service request message;
- wherein comparing the location of the communication device with the locations of the plurality of service devices to determine if one of the plurality of service devices satisfies the selection criterion comprises comparing the location of the communication device with the locations of the responding service devices to determine if one of the responding service devices satisfies a selection criterion; and
- wherein establishing communication between the communication device and the one of the plurality of service devices if the one of the plurality of service devices satisfies the selection criterion comprises establishing communication between the communication device and the one of the plurality of service devices if the one of the responding service devices satisfies the selection criterion.

26. The method of claim 24, wherein the communication device is associated with a user and is communicatively coupled to a control signal input device.

27. The method of claim 26, further comprising:

generating a control signal using the control signal input device; and sending the control signal to the one of the plurality of service devices if communication is established between the communication device and the one of the plurality of service devices.

28. The method of claim 26, wherein the control signal input device is selected from the group consisting of a blink detector and a voice recognition system.

29. The method of claim 24, wherein establishing communication between the communication device and the one of the plurality of service devices if the one of the plurality of service devices satisfies the selection criterion comprises:

establishing communication between the communication device and the one of the plurality of service devices using Bluetooth wireless communication technology if the one of the plurality of service devices satisfies the selection criterion.

30. A method of operating a communication system, comprising:

providing a plurality of service devices that have a data processing system associated therewith;

determining, at the data processing system, an orientation of a communication device;

determining, at the data processing system, if the communication device is directed towards one of the plurality of service devices; and establishing communication between the communication device and the one of the plurality of service devices if the communication device is directed towards the one of the plurality of service devices.

31. The method of claim 30, wherein the communication device is associated with a user and is communicatively coupled to a control signal input device.

32. The method of claim 31, further comprising:

generating a control signal using the control signal input device; and sending the control signal to the one of the plurality of service devices if communication is established between the communication device and the one of the plurality of service devices.

33. The method of claim 31 wherein the control signal input device is selected from the group consisting of a blink detector and a voice recognition system.

34. A method of operating a communication system, comprising:

providing a plurality of service devices;

determining an orientation of a communication device;

determining if the communication device is directed towards one of the plurality of service devices; and establishing communication between the communication device and the one of the plurality of service devices using Bluetooth wireless communication technology if the communication device is directed towards the one of the plurality of service devices.

* * * * *